United States Patent
Burns et al.

(10) Patent No.: US 12,515,553 B2
(45) Date of Patent: Jan. 6, 2026

(54) CHARGING STATION CABLING CONDITION REPORTING

(71) Applicant: GM GLOBAL TECHNOLOGY OPERATIONS LLC, Detroit, MI (US)

(72) Inventors: Denise A. Burns, Lake Orion, MI (US); Michael P. Kolb, Lake Orion, MI (US); Patricia M. Laskowsky, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 617 days.

(21) Appl. No.: 17/981,811

(22) Filed: Nov. 7, 2022

(65) Prior Publication Data

US 2024/0149739 A1 May 9, 2024

(51) Int. Cl.
*B60L 53/68* (2019.01)
*B60L 53/16* (2019.01)
*G06V 20/52* (2022.01)
*H04N 7/18* (2006.01)

(52) U.S. Cl.
CPC ............. *B60L 53/68* (2019.02); *B60L 53/16* (2019.02); *G06V 20/52* (2022.01); *H04N 7/181* (2013.01)

(58) Field of Classification Search
CPC .......... B60L 53/68; B60L 53/16; B60L 53/11; B60L 53/305; B60L 53/31; B60L 53/37; B60L 53/65; B60L 53/60; G06V 20/52; H04N 7/181
See application file for complete search history.

(56) References Cited

U.S. PATENT DOCUMENTS

| | | | |
|---|---|---|---|
| 2012/0135626 A1* | 5/2012 | Tormey | B60L 53/305 320/109 |
| 2019/0217715 A1* | 7/2019 | Christen | B60L 53/31 |
| 2020/0148068 A1* | 5/2020 | Melatti | B60L 53/60 |
| 2021/0325888 A1* | 10/2021 | Mandel-Senft | B60K 35/28 |

FOREIGN PATENT DOCUMENTS

| | | | | |
|---|---|---|---|---|
| DE | 102019007060 A1 | * | 7/2020 | ............. B60L 53/16 |
| DE | 102021102258 A1 | * | 8/2022 | ............. B60L 53/30 |

OTHER PUBLICATIONS

Machine translation of DE-102021102258-A1 (Year: 2025).*

* cited by examiner

*Primary Examiner* — David V Henze-Gongola
(74) *Attorney, Agent, or Firm* — Quinn IP Law (57) ABSTRACT

A charging system includes a service office, a charging station, a charging plug, a plurality of cameras, and a controller. The charging station is in communication with the service office. The service office is remote from the charging station. The charging plug is coupled to the charging station. The charging plug is operable to charge a battery of an electric vehicle. The plurality of cameras is coupled to the charging station. The plurality of cameras is operable to generate a plurality of images of the charging plug from a plurality of directions. The controller is disposed in the charging station. The controller is operable to transmit the plurality of images to the service office. The service office is operable to determine a physical state of the charging plug based on the plurality of images received from the controller.

20 Claims, 5 Drawing Sheets

CHARGING STATION CABLING CONDITION REPORTING

INTRODUCTION

The present disclosure relates to a system and a method for charging station cabling condition reporting.

An issue with unattended public charging stations is that broken components that are not reported by users or other timely inspections may go unrepaired. Improperly working equipment at the charging stations may result in unexpected situations or non-functional stations. Accordingly, those skilled in the art continue with research and development efforts in the field of charging station cabling condition reporting.

SUMMARY

A charging system is provided herein. The charging system includes a service office, a charging station a charging plug, a plurality of cameras, and a controller. The charging station is in communication with the service office. The service office is remote from the charging station. The charging plug is coupled to the charging station. The charging plug is operable to charge a battery of an electric vehicle. The plurality of cameras is coupled to the charging station. The plurality of cameras is operable to generate a plurality of images of the charging plug from a plurality of directions. The controller is disposed in the charging station. The controller is operable to transmit the plurality of images to the service office. The service office is operable to determine a physical state of the charging plug based on the plurality of images received from the controller.

In one or more embodiments, the charging system includes a plug sensor operational to sense that the charging plug is placed into a holster of the charging station. The plurality of cameras generate one or more of the plurality of images in response to the charging plug being placed into the holster.

In one or more embodiments, the charging system includes a plurality of contacts in the charging plug. At least one of the plurality of cameras generates a visible image among the plurality of images of the plurality of contacts.

In one or more embodiments, the charging system includes a plurality of contacts in the charging plug. At least one of the plurality of cameras generates an infrared image among the plurality of images of the plurality of contacts.

In one or more embodiments, the charging system includes at least one plug camera among the plurality of cameras mounted in the charging plug. The at least one plug camera is operational to generate a socket image among the plurality of images of a charging socket of the electric vehicle while the charging plug is proximate the charging socket.

In one or more embodiments, the charging system includes a holster operational to hold the charging plug while the charging plug is disconnected from the electric vehicle, and a lock operational to alternatively release from and hold the charging plug to the holster. The controller is further operational to receive a lock command from the service office to stop operations of the charging station, and control the lock to hold the charging plug in the holster in response to the lock command.

In one or more embodiments, the charging system includes a processor in the service office. The processor is operational to perform a machine learning process based on the plurality of images and a temperature rise rate in the charging plug during a recent vehicle charging event to determine if one or more repairs of the charging station are appropriate.

In one or more embodiments, the charging system includes a user interface device operational to request a user of the charging station to hold at least one of the charging plug and a charging cord in front of an exterior camera of the plurality of cameras. The charging cord couples the charging plug to the charging station. The exterior camera is operational to generate one or more exterior images among the plurality of images of the at least one of the charging plug and the charging cord.

In one or more embodiments, the charging system includes a test rig operational to perform a conductivity check of a plurality of contacts in the charging plug, and move away from the plurality of contacts after the conductivity check is complete. At least one of the plurality of cameras is operational to generate at least one post-test image among the plurality of images of the plurality of contacts after the test rig has moved away from the plurality of contacts. A holster operational to hold the charging plug while the charging plug is disconnected from the electric vehicle. A plug sensor disposed in the holster and operational to sense an improper placement of the charging plug in the holster. The charging station is operational to generate a message to a user of the charging station to reposition the charging plug in the holster in response to the improper placement.

A method for reporting a condition of cabling of a charging station is provided herein. The method includes generating a plurality of images of a charging plug with a plurality of cameras from a plurality of directions. The charging plug is operable to charge a battery of an electric vehicle. The charging plug is coupled to the charging station. The charging station is in communication with a service office. The service office is remote from the charging station. The method includes transmitting the plurality of images from a controller of the charging station to the service office, and determining a physical state of the charging plug at the service office based on the plurality of images received from the controller.

In one or more embodiments, the method includes sensing that the charging plug is placed into a holster of the charging station. The plurality of cameras generate one or more of the plurality of images in response to the charging plug being placed into the holster.

In one or more embodiments, the method includes generating a visible image among the plurality of images of a plurality of contacts in the charging plug.

In one or more embodiments, the method includes generating an infrared image among the plurality of images of a plurality of contacts in the charging plug.

In one or more embodiments, the method includes generating with at least one plug camera of the plurality of cameras mounted in the charging plug a socket image among the plurality of images of a charging socket of the electric vehicle the charging plug is proximate the charging socket.

In one or more embodiments, the method includes receiving a lock command at the controller from the service office to stop operations of the charging station, and holding the charging plug with a lock in a holster of the charging station in response to the lock command. The holster is operational to hold the charging plug while the charging plug is disconnected from the electric vehicle.

In one or more embodiments, the method includes performing a machine learning process based on the plurality of images and a temperature rise rate in the charging plug during a recent vehicle charging event to determine if one or more repairs of the charging station are appropriate.

In one or more embodiments, the method includes requesting a user of the charging station hold at least one of the charging plug and a charging cord in front of an exterior camera of the plurality of cameras, and generating one or more exterior images among the plurality of images of the at least one of the charging plug and the charging cord.

In one or more embodiments, the method includes performing a conductivity check of a plurality of contacts in the charging plug with a test rig, moving the test rig away from the plurality of contacts after the conductivity check is complete, and generating at least one post-test image among the plurality of images of the plurality of contacts after the test rig has moved away from the plurality of contacts.

In one or more embodiments, the method includes sensing an improper placement of the charging plug in a holster, and generating a message to a user of the charging station to reposition the charging plug in the holster in response to the improper placement.

A charging station is provided herein. The charging station includes a controller, a charging plug, a holster, and a plurality of cameras. The controller is in communication with a service office. The service office is remote from the charging station. The charging plug is coupled to the charging station. The charging plug is operable to charge a battery of an electric vehicle. The holster is operational to hold the charging plug while the charging plug is disconnected from the electric vehicle. The plurality of cameras are operable to generate a plurality of images of the charging plug from a plurality of directions while the charging plug is in the holster. The controller is further operable to transmit the plurality of images to the service office.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure provide a system and a method to monitor a physical state of cabling of an electric vehicle service equipment (EVSE) and provide remote reporting of appropriate repairs and user misuse. Components of an electric vehicle charging station (e.g., charging plug, coupler power and sense pins, charging cord) are viewed remotely with camera images, and subsequently assessed by software in a service office to determine damage and/or deterioration status. The information, a last charge event, and a coupler temperature profile are used to predict and schedule maintenance in a remotely located service office. A user interface device (e.g., a display or screen) is provided on the charging station to request that users hold the cabling (e.g., charging cord and charging plug) in front of a camera to record visible damage that may be present. The user interface device may also present a message to the user to reinsert an improperly stored charging plug back into a holster.

Figure 1:
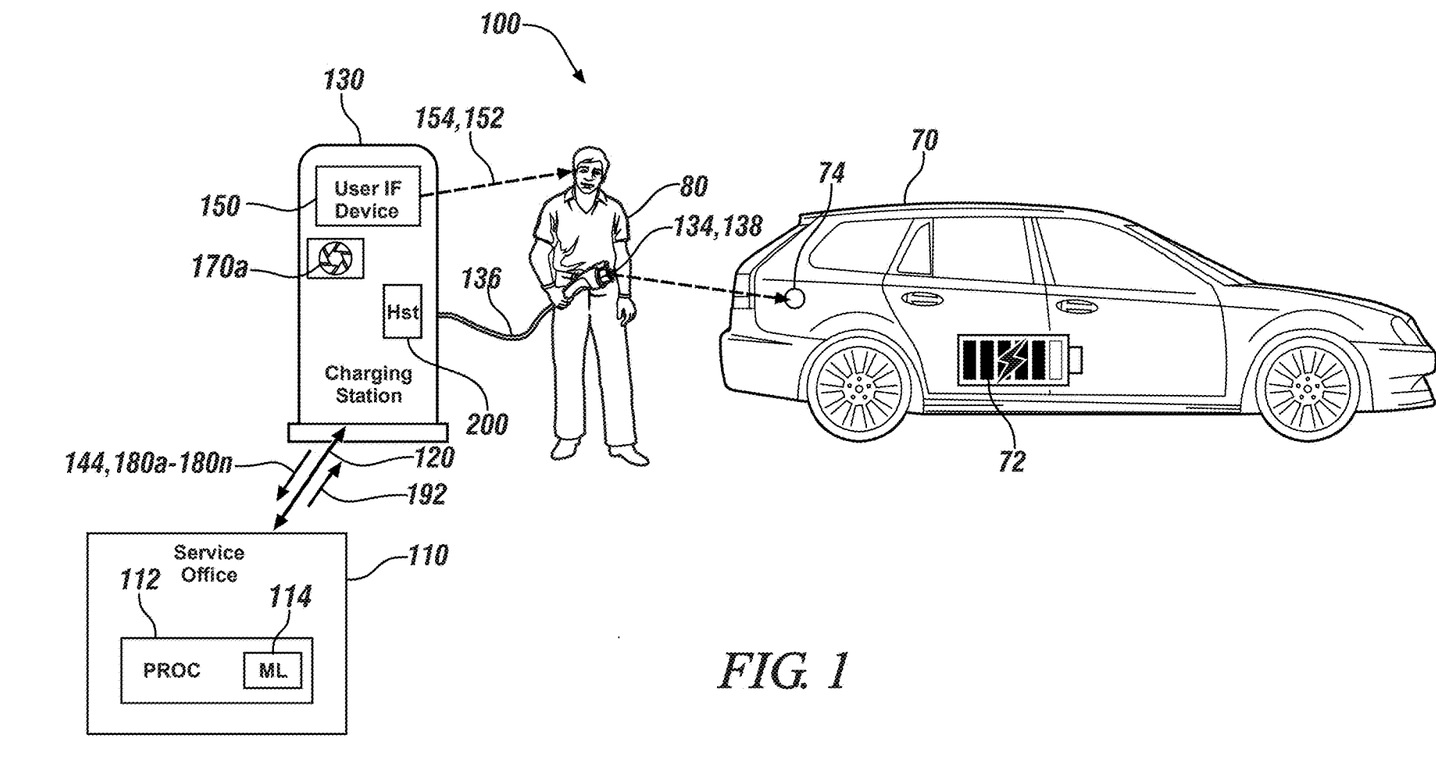
FIG. 1 is a schematic diagram illustrating a context of a charging system in accordance with one or more exemplary embodiments.

Referring to FIG. 1, a schematic diagram illustrating a context of a charging system 100 is shown in accordance with one or more exemplary embodiments. The charging system 100 generally includes one or more charging stations 130 (one shown), one or more electric vehicles 70 (one shown), one or more networks 120 (one shown), and a service office 110. The electric vehicles 70 may be connectable to the charging stations 130 to recharge batteries within the electric vehicles 70. In various embodiments, the charging sessions may monitor and evaluate the physical state (or condition) of cabling 134 of the charging station 130 to determine if repairs would be appropriate.

Each electric vehicle 70 implements an electric-powered vehicle, or a plug-in hybrid vehicle. Each electric vehicle 70 includes a battery 72 and a charging socket 74. The battery 72 is rechargeable through the charging socket 74 by the charging station 130. In various embodiments, the electric vehicles 70 may include, but are not limited to, passenger vehicles, trucks, autonomous vehicles, motorcycles, boats, and/or aircraft. Other types of electric vehicles 70 may be implemented to meet the design criteria of a particular application.

In various embodiments, the electric vehicles 70 may be compliant with the SAE International J1772 standard and/or the International Electrotechnical Commission (IEC) 61851-1 standard. The electric vehicles 70 may implement AC Level 1, AC Level 2, DC Level 1, and/or DC Level 2 charging capabilities. Other standards may be implemented to meet the design criteria of a particular application.

The user 80 is generally a driver of the electric vehicle 70. The user 80 may interact with the charging station 130 to charge the vehicle. The user 80 may also assist with an evaluation of the cabling 134 by holding the cabling 134 before a camera of the charging station 130 in response to instructions on the user interface device 150.

Each service office 110 implements a facility remotely located from the charging stations 130. The service offices 110 generally include one or more processors 112 (one shown) and a machine learning process 114 executable by the processors 112. A service office 110 may communicate with one or more charging stations 130 in a particular area through the network 120. The service offices 110 are generally operational to process the data received from the charging stations 130. The data may be used to determine when equipment at a charging station 130 should be repaired. Detectable repair conditions may include, but are not limited to, broken charger plug, broken/bent contacts, misaligned contacts, contact material degradation, melted contact components, broken cable casing, and similar charging socket 74 issues on the electric vehicle 70. Damage assessment and detection may include contact/pin temperature rise rate assessment of a recent charging event. Program executing in the service office 110 may use camera images 180a-180n, thermal data, and conductivity data to provide a real time estimate of remaining useful life of a charging plug and/or charging cord. The estimate generally allows charge station providers to plan maintenance and/or replacements at appropriate times.

The processors 112 are implemented in hardware, software executing on hardware, or a combination of both. The tangible, non-transitory memory (e.g., read-only memory in the form of optical, magnetic, and/or flash memory) is coupled to the processors 112. For example, application-suitable amounts of random-access memory, read-only memory, flash memory and other types of electrically erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry, may be implemented to support the processor 112.

Computer-readable and executable instructions embodying the present method may be recorded (or stored) in the memory and executed as set forth herein. The executable instructions may be a series of instructions employed to run applications on the processors 112 (either in the foreground or background). The processors 112 may receive commands and information, in the form of one or more input signals from the charging stations 130, and communicate instructions to the charging stations 130.

In various embodiments, the executable instructions may include the machine learning process 114. The machine learning process 114 is generally operational to evaluate the cabling 134 of the charging stations 130 by processing the images 180a-180n, refine the training, and generate machine learning evaluations of the cabling 134. The machine learning process 114 may conclude if and when repair and/or maintenance of the cabling 134 is appropriate.

The charging stations 130 implement electric vehicle 70 supply equipment. The charging stations 130 are operational to provide electrical power (e.g., electrical current at a voltage) to the electric vehicles 70 to recharge onboard batteries of the electric vehicles 70. In various embodiments, the charging stations 130 may be compliant with the SAE International J1772 standard and/or the International Electrotechnical Commission (IEC) 61851-1 standard. The charging stations 130 may be AC Level 1, AC Level 2, DC Level 1, and/or DC Level 2 chargers. Other charging standards may be implemented to meet the design criteria of a particular application. Some charging stations 130 may be placed at fixed locations. Other charging stations 130 may be mobile, for example, mounted on a flatbed truck.

Each charging station 130 includes multiple cameras 170a-170n (one illustrated in FIG. 1, more are in FIG. 2), a user interface device 150, a holster 200, the cabling 134, and a connection to the network 120. The cabling 134 includes a charging cord 136 and a charging plug 138. The charging plug 138 is designed to engage the charging socket 74 of the electric vehicle 70 during a charging session, and is coupled to the charging station 130 through the charging cord 136. The charging station 130 may transfer temperature data 144 and multiple images 180a-180n to the service office 110. The charging station 130 receives a lock command 192 from the service office 110.

The cameras 170a-170n implement still image cameras and/or video cameras. The cameras 170a-170n are coupled to the charging station 130 and are operational to generate images 180a-180n of the charging plug 138 and/or the charging cord 136 from a variety of directions. The images 180a-180n are transmitted to the service office 110 via the network 120. In some embodiments, a plug camera may be disposed in the charging plug 138 to record one or more images 180a-180n of the charging socket 74 of an electric vehicle 70.

The user interface device 150 is operational to interact with the users 80 and/or technicians. The user interface device 150 may present a request 152 instructing a user 80 to present the charging plug 138 and/or charging cord 136 before the external camera for capturing images 180a-180n after the charging plug 138 is disconnected from vehicle. Controls of the user interface device 150 may prompt technicians to present the charging plug 138 and/or charging cord 136 in front of the external camera. A visual and/or audio notification is generated by the user interface device 150 in response to acceptable image(s) being captured. The user interface device 150 may also present a message 154 to the user 80 to reposition the charging plug 138 in the holster 200.

The networks 120 implement communication networks. The networks 120 are generally operational to transfer data between the charging stations 130 and the service offices 110. The networks 120 may include one or more wired networks and/or one or more wireless networks 120. In various embodiments, the networks 120 may include the Internet, cellular networks, Wi-Fi networks, Ethernet networks, and the like.

Figure 2:
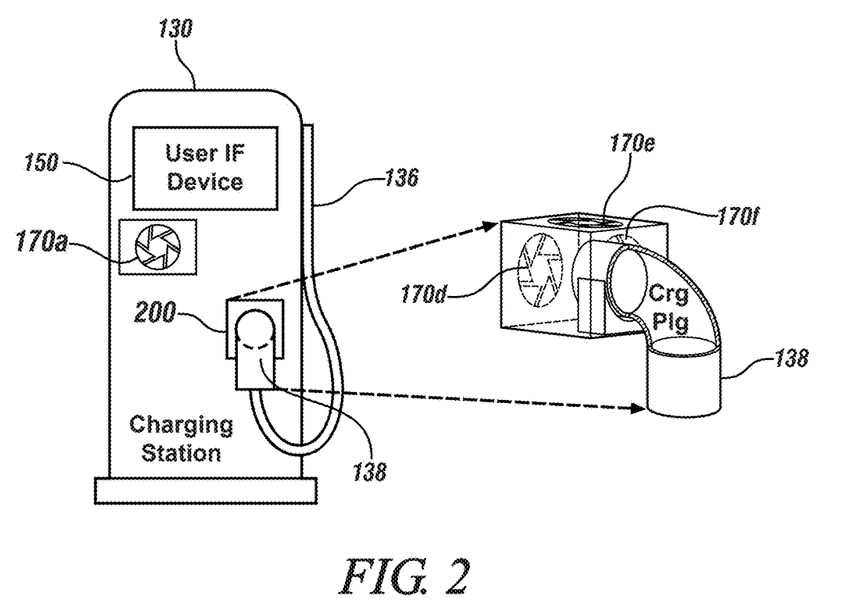
FIG. 2 is a schematic diagram of a charging station in accordance with one or more exemplary embodiments.
Figure 3:
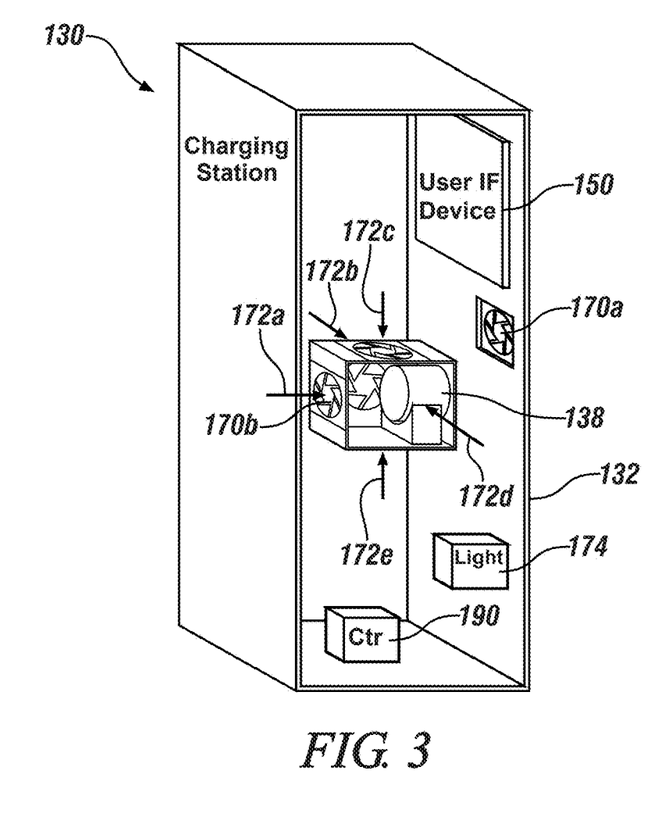
FIG. 3 is a schematic perspective cutaway diagram of the charging station in accordance with one or more exemplary embodiments.

Referring to FIG. 2 and FIG. 3, schematic diagrams of an example implementation of a charging station 130 are shown in accordance with one or more exemplary embodiments. The charging station 130 generally includes a housing (or cabinet) 132, the user interface device 150, multiple cameras 170a-170n, the holster 200, the charging cord 136, the charging plug 138, a controller 190, and multiple lights 174 (one shown). While in a standby state, the charging plug 138 rests in the holster 200. In other states, the charging plug 138 may be external to the holster 200. While the charging plug 138 is in the holster 200, the multiple cameras 170a-170n generate the multiple images 180a-180n from multiple directions 172a-172e (e.g., front, side, top, bottom). The lights 174 provide illumination of the charging plug 138 while resting in the holster 200.

The controller 190 implements control circuitry and communication circuitry. The controller 190 is operational to communicate with the service office 110 via the network 120. The controller 190 is also operational to trigger the cameras 170a-170n to take images 180a-180n in response to the charging plug 138 being placed in the holster 200, relay the images 180a-180n from the cameras 170a-170n to the service office 110, switch on/off the lights 174, and switch on/off the flow of electrical power to the charging plug 138. The controller 190 is also operational to lock/unlock the charging plug 138 in the holster 200 and present instructions on the user interface device 150. The instructions may include, but are not limited to, messages 154 to the users 80 to reposition the charging plug 138 in the holster 200 in response to an improper placement of the charging plug 138, and requests 152 to the users 80 to hold the charging plug 138 and/or the charging cord 136 in front of exterior camera 170a to capture exterior images 180a of an exterior of the charging plug 138 and the exterior of the charging cord 136.

Figure 4:
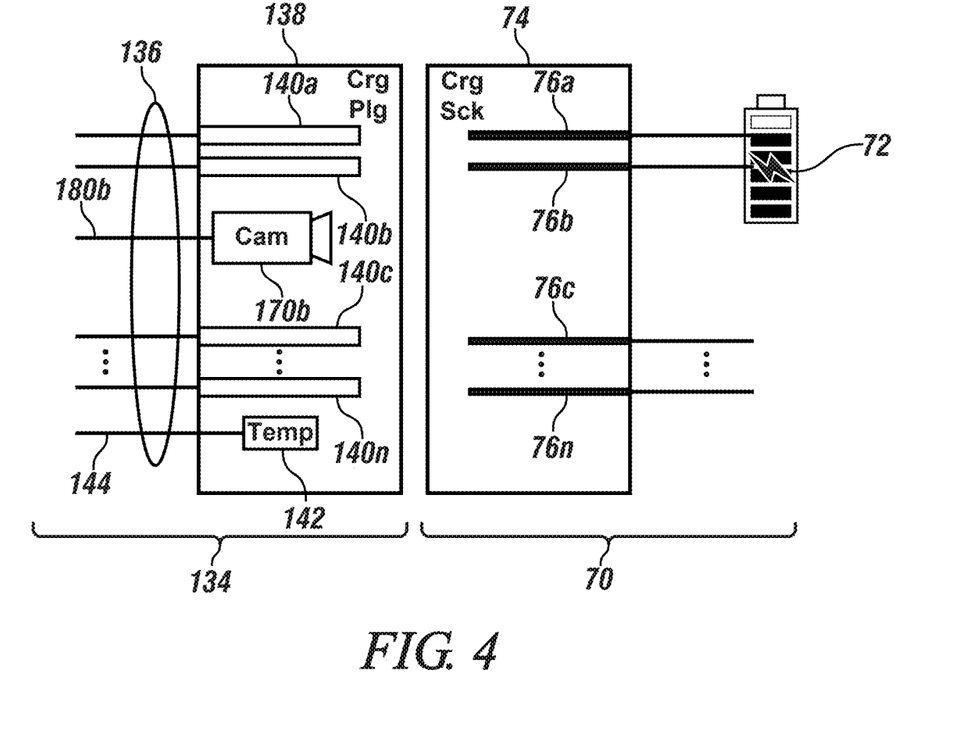
FIG. 4 is a schematic diagram of the charging station to electric vehicle interface in accordance with one or more exemplary embodiments.

Referring to FIG. 4, a schematic diagram of a charging station 130 to electric vehicle 70 interface is shown in accordance with one or more exemplary embodiments. The charging stations 130 includes the charging cord 136 and the charging plug 138. Other components may be included within the charging station 130 to meet a design criteria of a particular application. The electric vehicle 70 includes the charging socket 74 and the battery 72. Other components may be included within the electric vehicle 70 to meet a design criteria of a particular application.

The charging plug 138 includes multiple contacts 140a-140n and a temperature sensor 142. Some contacts 140a-140n (e.g., power contacts 140a-140b) are used to convey electrical power to the electric vehicle 70. Other contacts 140a-140n (e.g., signaling contacts 140c-140n) are used for handshaking between the charging station 130 and the electric vehicle 70. In various embodiments, the charging plug 138 may include a plug camera 170b. The plug camera 170b is operational to record one or more socket images 180b of the charging socket 74 while the charging plug 138 is proximate (e.g., a half inch to a few inches) away from the charging socket 74. A light (not shown) may be included in the charging plug 138 to illuminate the charging socket 74 in the event of poor ambient lighting conditions. The temperature sensor 142 is operational to measure a temperature of the contacts 140a-140n. Measured temperature data 144 is transferred to the controller 190 through the charging cord 136.

The charging socket 74 includes multiple pins 76a-76n. Some pins 76a-76n (e.g., power pins 76a-76b) are used to receive the electrical power from the charging station 130. Other pins 76a-76n (e.g., signaling pins 76c-76n) are used for the handshaking. For example, some of the signaling contacts 140c-140n and signaling pins 76c-76n are used to determine that the power contacts 140a-140b of the charging plug 138 are engaged with the power pins 76a-76b of the charging socket 74 and so electrical power may flow through the charging plug 138 into the charging socket 74. Some of the signaling contacts 140c-140n and/or the signaling pins 76c-76n may be physically shorter than the power contacts 140a-140b/power pins 76a-76b to break contact before the power contacts 140a-140b disengage the power pins 76a-76b as the charging plug 138 is removed from the charging socket 74. The break in the signaling contacts 140c-140n/signaling pins 76c-76n may inform the charging station 130 to switch off the electrical power and begin receiving the socket images 180b from the plug camera 170b.

Figure 5:
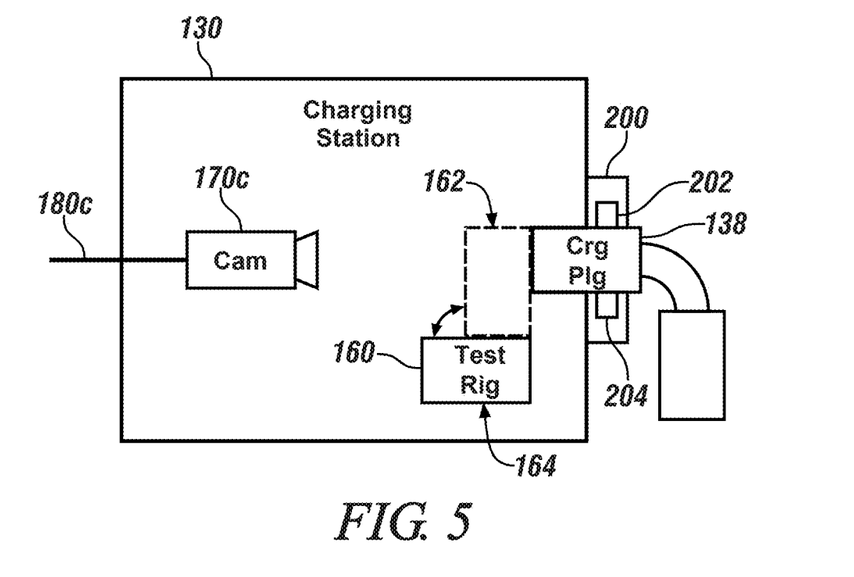
FIG. 5 is a schematic diagram of an electrical conductivity test configuration in accordance with one or more exemplary embodiments.

Referring to FIG. 5, a schematic diagram of an example electrical conductivity test configuration in the charging station 130 is shown in accordance with one or more exemplary embodiments. The charging station 130 may include one or more plug sensors (one shown) 202 and a lock 204 in the holster 200. The plug sensors 202 are operational to sense that the charging plug 138 is properly positioned within or moved from the holster 200. The plug sensors 202 are also operational to inform the controller 190 when the charging plug 138 is properly positioned or removed from the holster 200. The lock 204 is operational to alternatively release from and hold the charging plug 138 to the holster 200 as commanded by the controller 190.

In some embodiments, the charging station 130 may include a moveable test rig 160. The test rig 160 may have a test position 162 and an idle position 164. While in the test position 162, the test rig 160 may connect with the contacts 140a-140n (FIG. 4) of the charging plug 138 for the conductivity tests. While in the idle position 164, the test rig 160 may move away from the open end of the charging plug 138 to enable a contact camera 170c to record one or more post-test images 180c of the contacts 140a-140n and the physical structure of the charging plug 138 around the contacts 140a-140n.

Figure 6:
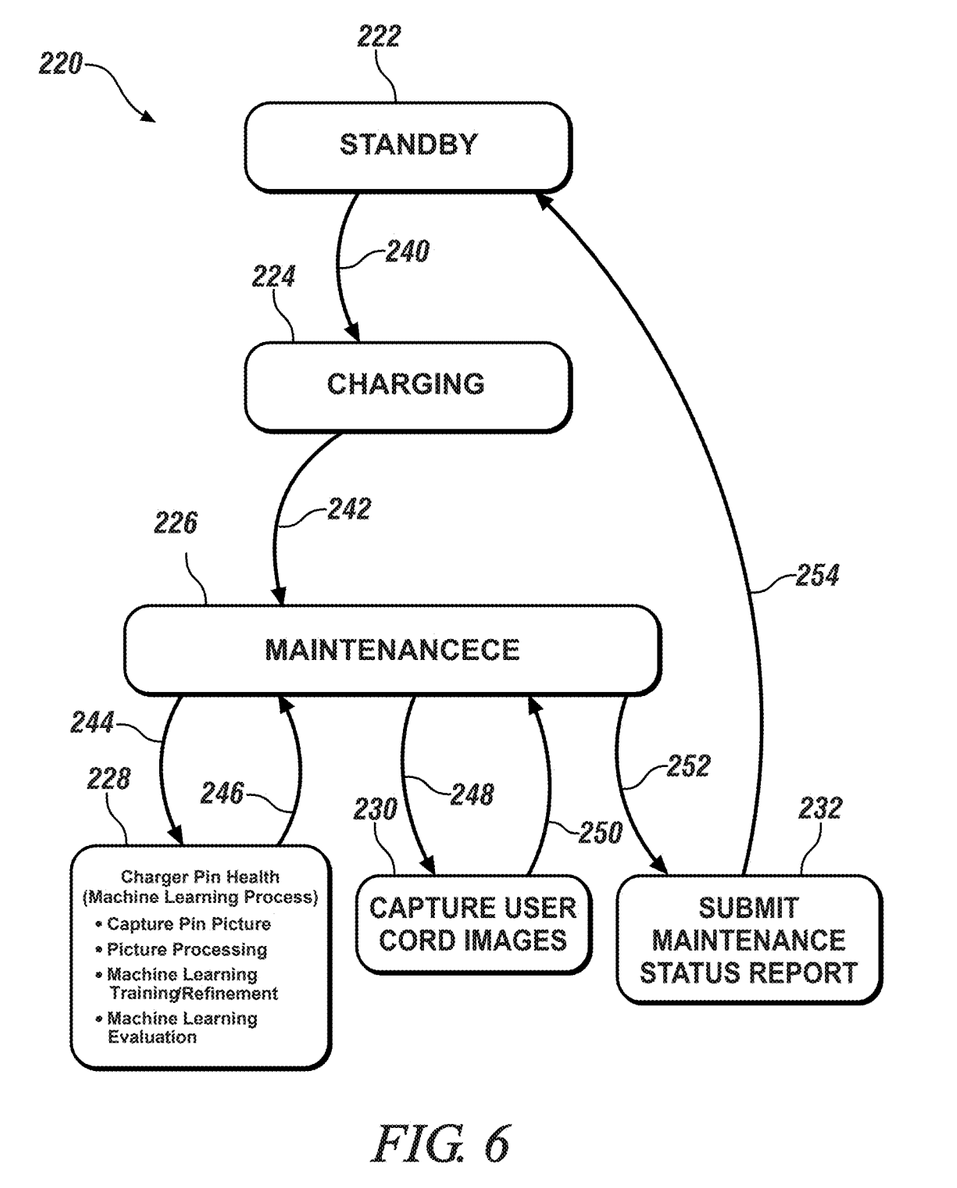
FIG. 6 is a schematic state transition diagram for a maintenance monitoring operation in accordance with one or more exemplary embodiments.

Referring to FIG. 6, a schematic state transition diagram 220 of an example maintenance monitoring operation is shown in accordance with one or more exemplary embodiments. The state transition diagram 220 is implemented by the charging system 100. The state transition diagram 220 includes a standby state 222, a charging state 224, a maintenance state 226, a machine learning state 228, a capture cord image state 230, and a submit maintenance report state 232.

While in the standby state 222, the charging station 130 removes electrical power from the charging plug 138. When a start charging event condition 240 exists, the charging station 130 transitions to the charging state 224. While in the charging state 224, electrical power is provided through the charging plug 138 and the charging socket 74 to charge the battery in the electric vehicle 70. When a charging complete condition 242 exists (e.g., the battery 72 is charged and/or the charging plug 138 is removed from the charging socket 74), the charging system 100 transitions to the maintenance state 226.

When a return to holster condition 244 is sensed, the charging system 100 transitions to the machine learning state 228. In the machine learning state 228, the charging station 130 captures the images 180a-180n. The service office 110 processes the images 180a-180n, performs machine learning training and/or refinement, and a machine learning evaluation is generated. Once the learning is complete 246 the charging system 100 transitions back to the maintenance state 226.

If the evaluation determines that additional data would be helpful, a presentation request condition 248 is triggered and the charging system 100 transitions to the capture cord image state 230. While in the capture cord image state 230, the charging station 130 requests the user 80 present the charging plug 138 and/or the charging cord 136 to the exterior camera 170a. After the requested exterior images 180a of the charging plug 138 and/or the charging cord 136 are captured 250, the charging system 100 returns to the maintenance state 226. The service office 110 may use the exterior images 180a in the machine learning state 228 to update the evaluation.

In response to a start status report 252 being requested for a particular charging station 130, the charging system 100 may transition to the submit maintenance report state 232. The service office 110 subsequently generates a status report for the particular charging station 130. After the report is complete 254, the charging system 100 returns to the standby state 222.

Figure 7:
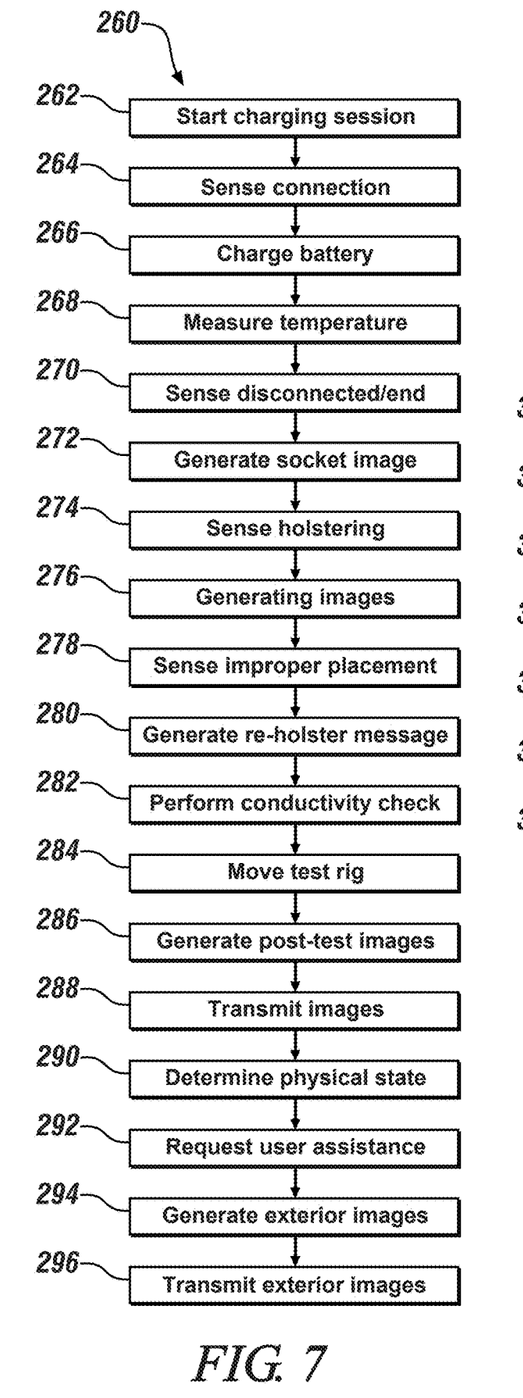
FIG. 7 is a flow diagram of a method for reporting a condition of cabling in accordance with one or more exemplary embodiments.

Referring to FIG. 7, a flow diagram of an example method 260 for reporting a condition of a cabling of a charging station is shown in accordance with one or more exemplary embodiments. The method (or process) 260 is implemented by the charging system 100. The method 260 generally includes steps 262 to 296, as illustrated. The sequence of steps is shown as a representative example. Other step orders may be implemented to meet the criteria of a particular application.

In the step 262, a charging session may be started. The start of the charging session may be initiated by a switch on the user interface device 150. The sensing contacts in the charging plug may determine that the charging plug 138 has made electrical connection with the charging socket 74 in the step 264. The battery 72 is subsequently charged in the step 266.

In the step 268, a time-dependent temperature of charging plug 138 is measured and reported during the charging session. In the step 270, a disconnect may be sensed between the charging plug 138 from the charging socket 74 and/or an end of the charging session may be determined because the battery 72 is charged. In response to sensing a slight separation (e.g., the disconnect) between the charging plug 138 and the charging socket 74, the plug camera 170b may record the socket images 180b of a charging socket 74 and the pins 76a-76n in the step 272.

In the step 274, the charging station 130 may sense that the charging plug 138 is placed into the holster 200. In response, images 180a-180n (visible images (e.g., image 180m) and/or infrared images (e.g., image 180n)) of a charging plug 138 and/or the charging cord 136 may be captured from multiple directions 172a-172e in the step 276. If an improper placement of the charging plug 138 in the holster 200 is sensed in the step 278, the user interface device 150 may generate a message 154 to the user 80 in the step 280 to reposition the charging plug 138 in the holster 200.

In the step 282, the test rig 160 may be moved into position before and mated with the contacts 140a-140n of the charging plug 138. An electrical conductivity check of the contacts 140a-140n may be performed in the step 284. After test completion, the test rig 160 may be moved away from the contacts 140a-140n in the step 284. The contact camera 170c generates at least one post-test image 180c of the contacts 140a-140n after the test rig 160 has moved away in the step 286. In the step 288, the controller 190 may transmit the images 180a-180n and the temperature data 144 to the service office 110. In the step 290, the service office 110 determines a physical state of the charging plug 138 and/or the charging cord 136 based on the images 180a-180n, and the temperature data 144 from a recent charging event.

In the step 292, the charging station 130 may present a request 152 to the user 80 to hold at least one of the charging plug 138 and a charging cord 136 in front of the exterior camera 170a. The exterior camera 170a may generate one or more exterior images 180a in the step 294 of the charging plug 138 and/or the charging cord 136. In the step 296, the exterior images 180a are transmitted to the service office 110 for further evaluation of the cabling 134.

Figure 8:
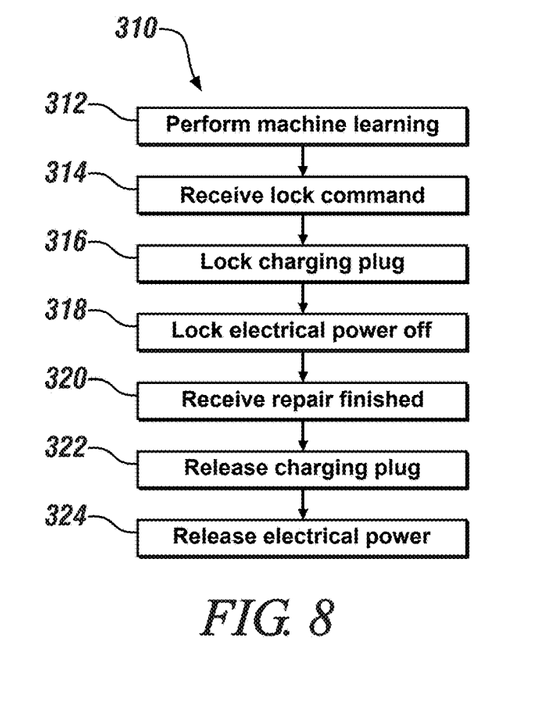
FIG. 8 is a flow diagram of a method for disabling a charging station in accordance with one or more exemplary embodiments The sequence of steps is shown as a representative example. Other step orders may be implemented to meet the criteria of a particular application.

Referring to FIG. 8, a flow diagram of an example method 310 for disabling a charging station is shown in accordance with one or more exemplary embodiments. The method (or process) 310 is implemented by the charging system 100. The method 310 generally includes steps 312 to 324, as illustrated. The sequence of steps is shown as a representative example. Other step orders may be implemented to meet the criteria of a particular application.

In the step 312, the service office 110 performs the machine learning process 114 based on the images 180a-180n and the temperature rise rate in the charging plug 138 during a recent vehicle charging event to determine if repairs/maintenance of the charging station 130 are appropriate. If the service office 110 determines that repairs and/or maintenance is appropriate, the charging station 130 receives a lock command 192 in the step 314 to stop operations of the charging station 130. In the step 316, the charging plug 138 is locked to the holster 200 by the lock 204. The electrical power is locked in an off state in the step 318. One or more technicians may subsequently repair the charging plug 138 and/or the charging cord 136.

In the step 320, the charging station 130 receives a repair finished indication from the technician. The charging plug 138 is released from the holster 200 in the step 322. The lock on the electrical power is removed in the step 324.

The charging system generally addresses timely health reporting of equipment on a remote charging station and encourages the appropriate usage of the charging station. A series of cameras (still and/or video) are located in the holster/carrier for the charger plug. The connector camera is mounted inside the housing directly across from the holster and focused on the connectors in the charging plug. Images are obtained each time a charging event/attempted charging event is complete and the charging plug is returned to the holster. Additional cameras may be mounted inside at orthogonal positions to view the exterior of the charging plug at rest inside the holster. Machine learning techniques use the images, along with performance parameters/profile of previous charges, and an electrical conductivity check for automated inspection and maintenance policies for the charging station(s). The camera images may also provide feedback to the charging system to indicate whether the user returns the charge plug to the holster and/or another suitable storage location. When a charging plug is not returned to the correct storage location after the charge event is complete, the system may notify the user via the user interface device. The system may also use the improper return of the charging plug to decide if additional fees may be charged for mishandling. Various embodiments of the charging system may include an exterior camera mounted to the charger housing. The exterior camera is available for the user to present the charging plug and/or the charging cord in various orientations for video/still photos to be captured that show the physical state of the charging cord and/or charging plug. The resulting images may be used for technical service call interactions with the users.

Embodiments of the disclosure generally provide a charging system that includes a service office remote from a charging station. The charging station has a charging plug, multiple cameras, and a controller. The charging plug may be operable to charge a battery of an electric vehicle. The cameras are operable to generate multiple images of the charging plug from multiple directions. The controller is operable to transmit the images to the service office. The service office is operable to determine a physical state of the charging plug based on the images received from the controller.

Numerical values of parameters (e.g., of quantities or conditions) in this specification, including the appended claims, are to be understood as being modified in each instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of values and further divided ranges within the entire range. Each value within a range and the endpoints of a range are hereby disclosed as a separate embodiment.

While the best modes for carrying out the disclosure have been described in detail, those familiar with the art to which this disclosure relates will recognize various alternative designs and embodiments for practicing the disclosure within the scope of the appended claims.

What is claimed is:

1. A charging system comprising:
a service office with a processor;
a charging station in communication with the service office, wherein the service office is remote from the charging station;
a charging plug coupled to the charging station, wherein the charging plug is operable to charge a battery of an electric vehicle;
a plurality of cameras coupled to the charging station, wherein the plurality of cameras are operable to generate a plurality of images of the charging plug from a plurality of directions; and
a controller disposed in the charging station, wherein the controller is operable to transmit the plurality of images to the service office, wherein:
the service office is operable to determine a physical state of the charging plug based on the plurality of images received from the controller; and
the processor is operational to perform a machine learning process based on the plurality of images and a temperature rise rate in the charging plug during a recent vehicle charging event to determine if one or more repairs of the charging station are appropriate.

2. The charging system according to claim 1, further comprising:
a plug sensor operational to sense that the charging plug is placed into a holster of the charging station, wherein
the plurality of cameras generate one or more of the plurality of images in response to the charging plug being placed into the holster.

3. The charging system according to claim 1, further comprising:
a plurality of contacts in the charging plug, wherein at least one of the plurality of cameras generates a visible image among the plurality of images of the plurality of contacts.

4. The charging system according to claim 1, further comprising:
a plurality of contacts in the charging plug, wherein at least one of the plurality of cameras generates an infrared image among the plurality of images of the plurality of contacts.

5. The charging system according to claim 1, wherein
at least one plug camera among the plurality of cameras is mounted in the charging plug; and
the at least one plug camera is operational to generate a socket image among the plurality of images of a charging socket of the electric vehicle while the charging plug is proximate the charging socket.

6. The charging system according to claim 1, further comprising:
a holster operational to hold the charging plug while the charging plug is disconnected from the electric vehicle; and
a lock operational to alternatively release from and hold the charging plug to the holster, wherein the controller is further operational to:
receive a lock command from the service office to stop operations of the charging station; and
control the lock to hold the charging plug in the holster in response to the lock command.

7. The charging system according to claim 1, further comprising:
a user interface device operational to request a user of the charging station to hold at least one of the charging plug and a charging cord in front of an exterior camera of the plurality of cameras, wherein:
the charging cord couples the charging plug to the charging station; and
the exterior camera is operational to generate one or more exterior images among the plurality of images of the at least one of the charging plug and the charging cord.

8. The charging system according to claim 1, further comprising:
a test rig operational to:
perform a conductivity check of a plurality of contacts in the charging plug; and
move away from the plurality of contacts after the conductivity check is complete, wherein
at least one of the plurality of cameras is operational to generate at least one post-test image among the plurality of images of the plurality of contacts after the test rig has moved away from the plurality of contacts;
a holster operational to hold the charging plug while the charging plug is disconnected from the electric vehicle; and
a plug sensor disposed in the holster and operational to sense an improper placement of the charging plug in the holster, wherein
the charging station is operational to generate a message to a user of the charging station to reposition the charging plug in the holster in response to the improper placement.

9. A method for reporting a condition of cabling of a charging station comprising:
generating a plurality of images of a charging plug with a plurality of cameras from a plurality of directions, wherein the charging plug is operable to charge a battery of an electric vehicle, the charging plug is coupled to the charging station, the charging station is in communication with a service office, and the service office is remote from the charging station;
transmitting the plurality of images from a controller of the charging station to the service office;
determining a physical state of the charging plug at the service office based on the plurality of images received from the controller; and
performing a machine learning process based on the plurality of images and a temperature rise rate in the charging plug during a recent vehicle charging event to determine if one or more repairs of the charging station are appropriate.

10. The method according to claim 9, further comprising:
sensing that the charging plug is placed into a holster of the charging station, wherein
the plurality of cameras generate one or more of the plurality of images in response to the charging plug being placed into the holster.

11. The method according to claim 9, further comprising:
generating a visible image among the plurality of images of a plurality of contacts in the charging plug.

12. The method according to claim 9, further comprising:
generating an infrared image among the plurality of images of a plurality of contacts in the charging plug.

13. The method according to claim 9, further comprising:
generating with at least one plug camera of the plurality of cameras mounted in the charging plug a socket image among the plurality of images of a charging socket of the electric vehicle the charging plug is proximate the charging socket.

14. The method according to claim 9, further comprising:
receiving a lock command at the controller from the service office to stop operations of the charging station; and
holding the charging plug with a lock in a holster of the charging station in response to the lock command, wherein the holster is operational to hold the charging plug while the charging plug is disconnected from the electric vehicle.

15. The method according to claim 9, further comprising:
requesting a user of the charging station hold at least one of the charging plug and a charging cord in front of an exterior camera of the plurality of cameras; and
generating one or more exterior images among the plurality of images of the at least one of the charging plug and the charging cord.

16. The method according to claim 9, further comprising:
performing a conductivity check of a plurality of contacts in the charging plug with a test rig;
moving the test rig away from the plurality of contacts after the conductivity check is complete; and
generating at least one post-test image among the plurality of images of the plurality of contacts after the test rig has moved away from the plurality of contacts.

17. The method according to claim 9, further comprising:
sensing an improper placement of the charging plug in a holster; and
generating a message to a user of the charging station to reposition the charging plug in the holster in response to the improper placement.

18. A charging station comprising:
a controller in communication with a service office, wherein the service office has a processor and is remote from the charging station;
a charging plug coupled to the charging station, wherein the charging plug is operable to charge a battery of an electric vehicle;
a holster operational to hold the charging plug while the charging plug is disconnected from the electric vehicle; and
a plurality of cameras operable to generate a plurality of images of the charging plug from a plurality of directions while the charging plug is in the holster, wherein:
the controller is operable to transmit the plurality of images to the service office; and
the processor is operational to perform a machine learning process based on the plurality of images and a temperature rise rate in the charging plug during a recent vehicle charging event to determine if one or more repairs of the charging station are appropriate.

19. The charging station according to claim 18, further comprising:
a plug sensor operational to sense that the charging plug is placed into a holster of the charging station, wherein the plurality of cameras generate one or more of the plurality of images in response to the charging plug being placed into the holster.

20. The charging station according to claim 18, further comprising:
a plurality of contacts in the charging plug, wherein at least one of the plurality of cameras generates a visible image among the plurality of images of the plurality of contacts.

* * * * *